United States Patent Office 3,151,109
Patented Sept. 29, 1964

3,151,109
NITRO STEROIDS AND METHOD OF
PREPARING THE SAME
Robert E. Schaub, Paramus, and Martin J. Weiss, Oradell,
N.J., assignors to American Cyanamid Company, Stamford, Conn., a corporation of Maine
No Drawing. Filed Dec. 6, 1962, Ser. No. 242,628
20 Claims. (Cl. 260—239.55)

This invention relates to new steroid compounds. More particularly, it relates to 2- and 4-nitro steroids of the pregnane and androstane series, intermediate compounds and to methods for preparing the same.

The novel steroids of the present invention can be illustrated by the following formula:

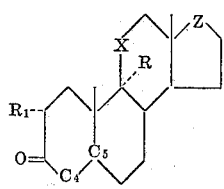

in which Z is selected from the group consisting of:

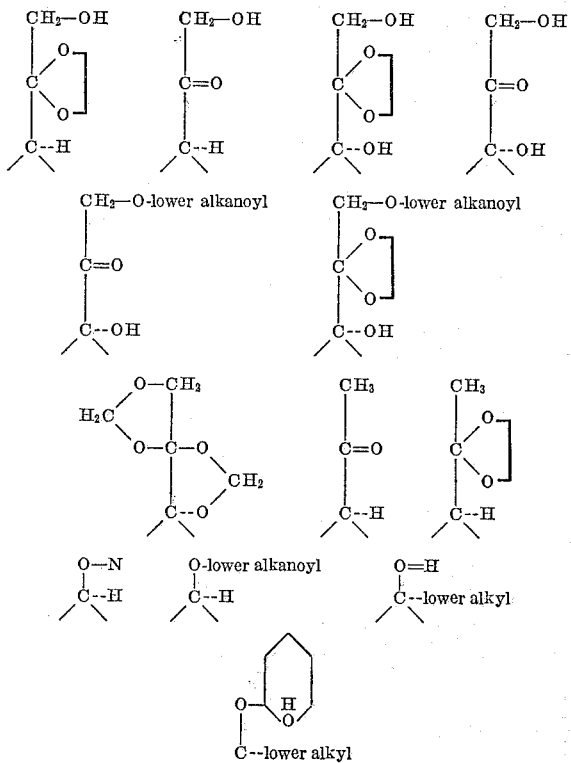

and

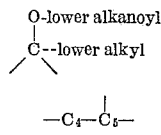

is selected from the group consisting of:

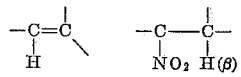

and

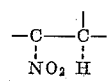

X is selected from the group consisting of

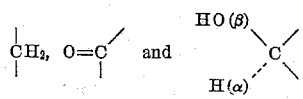

groups, R is selected from the group consisting of hydrogen and fluorine atoms, $R_1$ is selected from the group consisting of hydrogen and nitro groups, at least one nitro group being present on the steroid; and the corresponding 2,3-enols.

The compounds of the present invention are, in general, crystalline solids. They are relatively insoluble in water, but somewhat soluble in the common organic solvents such as acetone, petroleum ether, etc.

More specifically, the novel nitro steroids of the present invention can be illustrated by the following structural formula:

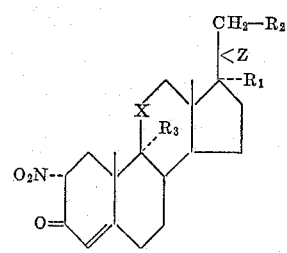

in which $R_1$ is selected from the group consisting of hydrogen and hydroxy radicals; $R_2$ is selected from the group consisting of hydrogen, hydroxy and alkanoyloxy radicals; $R_3$ is selected from the group consisting of hydrogen and fluorine radicals; Z is selected from the group consisting of oxygen and lower alkylenedioxy radicals; X is a divalent radical selected from the group consisting of

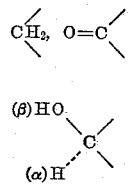

and when taken together $R_1$, $R_2$ and Z is the 17α,20:20,21-bismethylenedioxy group; and the corresponding 2,3-enols. Also more specifically the present compounds can be illustrated by the following Formulae II and III illustrating $C_{19}$ steroids:

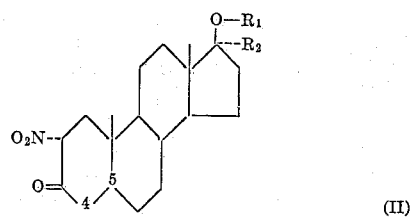

in which $R_1$ is selected from the group consisting of hydrogen, alkanoyloxy and 2-tetrahydropyranyloxy radicals; $R_2$ is selected from the group consisting of hydrogen and lower alkyl radicals; —$C_4$—$C_5$— is a divalent radical selected from the group consisting of

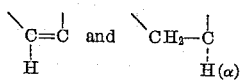

and the corresponding 2,3-enols.

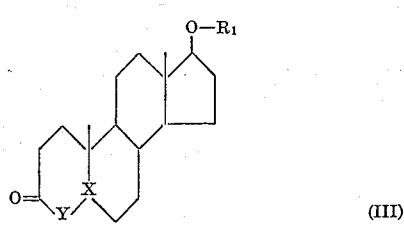

(III)

in which $R_1$ is selected from the group consisting of hydrogen and alkanoyloxy radicals; Y is a divalent radical selected from the group consisting of

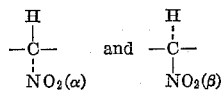

and X is a trivalent radical selected from the group consisting of

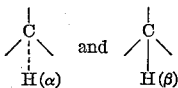

The nitro steroids of this invention are prepared by treating a 3-keto steroid as illustrated hereinbefore in an anhydrous solvent, such as tetrahydrofuran or t-butanol, with a strong base, for example a metal alkoxide, preferably freshly sublimed potassium t-butoxide, and subsequently with a small molar excess of an alkyl nitrate (e.g. amyl nitrate) at temperatures in the range of $-50°$ to $+20°$ C., preferably $-30°$ C., for from ten minutes to several hours, preferably about thirty minutes. When the solvent is tetrahydrofuran, it is sometimes expedient to add a relatively small amount of anhydrous t-butanol, which then often affords a homogenous reaction solution. The resulting $\alpha$-nitro ketone is then produced in the form of its metal salt. The free steroid can be liberated by treatment with strong acid, preferably mineral acid such as hydrochloric acid. The products are purified by the usual procedures of washing, recrystallization and chromatography.

This procedure may be understood as involving the initial formation of a steroid enolate anion (V) as shown hereinafter, when the keto steroid (IV) is treated with base. The enolate anion then reacts with the alkyl nitrate to give the salt of the $\alpha$-nitro ketone (VI). The steroid enolate anion may also be developed by treatment of a conjugated ketone, such as a $\Delta^4$-3-ketone (IX), with a liquid ammonia solution of an alkali or alkaline earth metal such as lithium. The latter procedure is of particular value since it allows the formation of a 4-enolate anion (X) in the 5$\alpha$-steroid series. In contrast, as indicated above, direct treatment of a 5$\alpha$-3-ketone (IV) with base gives the 2-enolate anion (V) in the 5$\alpha$-series. These reactions which are considered to take place in Ring A of the steroid nucleus can be illustrated as follows.

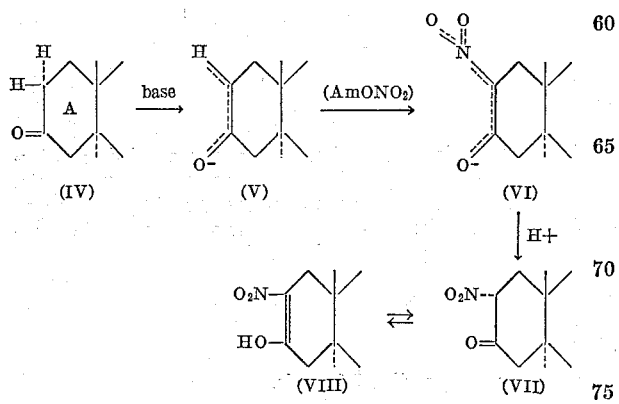

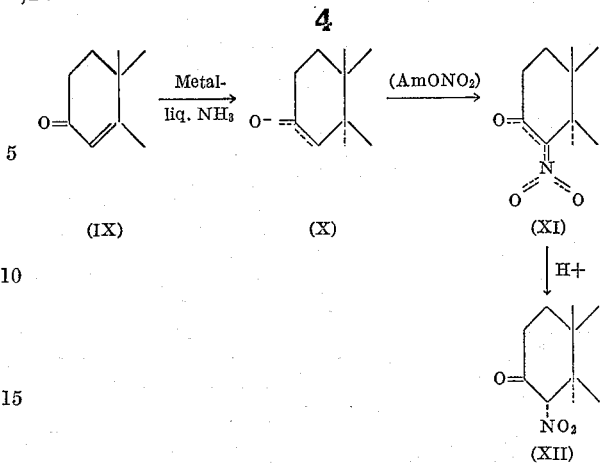

The utility of the lithium-liquid ammonia procedure for the formation of 4-substituted-5$\alpha$-3-keto steroids is further exemplified by the conversion of testosterone into 4$\alpha$-methyl-5$\alpha$-dihydrotestosterone on treatment with lithium-liquid ammonia followed by methyl iodide. This procedure for the development of C-4 enolate anions in the 5$\alpha$-series is to be considered a part of this invention and is further illustrated as follows.

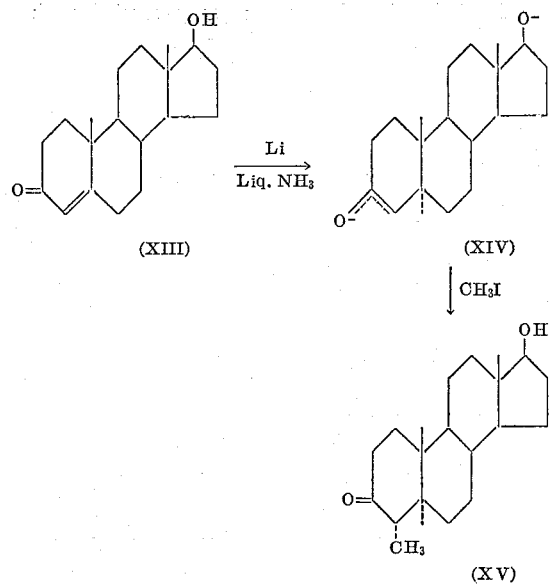

When the alkoxide-alkyl nitrate procedure is applied to a $\Delta^4$-3-keto steroid a 2$\alpha$-nitro-$\Delta^4$-3-ketone is obtained. When this procedure is applied to a 3-keto-5$\alpha$-steroid, a 2-nitro-3-keto-5$\alpha$-steroid is obtained and when applied to a 3-keto-5$\beta$-steroid, a 4-nitro-3-keto-5$\beta$-steroid is obtained.

The 2$\alpha$-nitro-$\Delta^4$-3-keto steroids and the 2$\alpha$-nitro-3-keto-5$\alpha$-steroids of this invention also exist in the corresponding 2,3-enolic forms, as illustrated immediately below. These enolic forms are considered to be within and a part of the present invention.

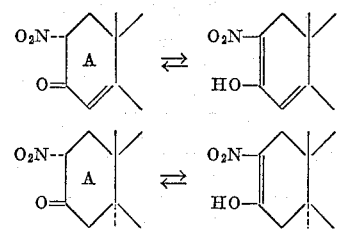

The processes of this invention proceed under steric influences and isomers are formed. The isomers obtained have been characterized as indicated on the basis of an analysis of molecular rotation, ultraviolet, and infrared spectroscopic and nuclear magnetic resonance data. These interpretations have been made on the basis of the presently understood state of the art, and are presented in order to provide a more complete exposition of the present invention, and so that the specification shall constitute a more useful contribution to the art. It will be apparent that no part of the specification will be materially defective if it should later be established that the isomers are other than deducible from data presently available, and as presently understood by workers in the field.

The novel C–19 steroids (Formulae II, III) of this invention are particularly useful as androgenic agents and as such they may be used in androgenic-replacement therapy. The compounds of this invention also inhibit growth of certain microorganisms. When tested by agar dilution techniques, the compounds inhibit the growth of fungi such as *Trichophyton mentogrophytes* and *Microsporum gypseum*. The present compounds, therefore, are useful as fungicides. The C–21 steroids (Formula I hereinbefore) of this invention are also useful as central nervous system depressants.

The following examples illustrate the preparation of representative 2- and 4-nitro steroids of the present invention.

EXAMPLE I

*Preparation of 20-Ethylenedioxy-2α-Nitropregn-4-En-3-One*

A solution of 3 g. of 20-ethylenedioxypregn-4-en-3-one [M. Gut, J. Org. Chem., 21, 1327 (1956)] in 65 ml. of purified tetrahydrofuran is added to a stirred solution of 1.55 g. of sublimed potassium tertiary butoxide in 40 ml. of tetrahydrofuran at $-30°$. After the addition of 3 ml. of purified tertiary butyl alcohol to affect solution, there is added 15 ml. of tetrahydrofuran containing 1.84 g. of amyl nitrate. The resulting solution is kept at $-30°$ for 30 minutes and then allowed to come to room temperature during approximately 45 minutes. The resulting mixture is acidified with 2 N hydrochloric acid, followed by the addition of water; the resulting solution being extracted twice with methylene chloride. The combined extracts are washed with water, dried with anhydrous magnesium sulfate and evaporated to dryness. Recrystallization of the residue form methylene chloride-ether furnishes 2.35 g. (70%) of product, melting point 213–217° dec. Recrystallization from the same solvent pair gives pale yellow crystals, melting point 222–224° dec., $[\alpha]_D^{25}$ +173° (0.7% in $CHCl_3$);

$\lambda_{max.}^{MeOH}$ 244 m$\mu$ ($\epsilon$ 15,700), 370 m$\mu$ ($\epsilon$ 1,800); $\lambda_{max.}^{0.1\,N\,HCl}$ 252 m$\mu$ ($\epsilon$ 16,000); $\lambda_{max.}^{0.1\,N\,NaOH}$ 242 m$\mu$ ($\epsilon$ 8,700), 269 m$\mu$ ($\epsilon$ 8,450), 353 m$\mu$ ($\epsilon$ 12,700); $\lambda_{max.}^{CHBr_3}$ 5.91, 6.18, 6.41, 7.28$\mu$.

In solution the title compound is in equilibrium with the corresponding 2,3-enol: 20-ethylenedioxy-3-hydroxy-2-nitropregna-2,4-diene.

EXAMPLE II

*Preparation of 2α-Nitropregn-4-Ene-3,20-Dione (2α-Nitroprogesterone)*

A solution of 750 mg. of 20-ethylenedioxy-2α-nitropregn-4-en-3-one (Example I) in 100 ml. of methanol containing 4 ml. of 8% (v./v.) sulfuric acid is refluxed on the steam bath for 45 minutes. After concentration to a small volume under reduced pressure, water is added followed by filtration to give 622 mg. (93%) of product, melting point 151–154° (gas). Recrystallization from methylene chloride-ether affords pale-yellow crystals, melting point 166–168°, $[\alpha]_D^{25}$ +262° (1.03% in $CHCl_3$);

$\lambda_{max.}^{MeOH}$ 243 m$\mu$ ($\epsilon$ 16,700); $\lambda_{max.}^{0.1\,N\,HCl}$ 252 m$\mu$ ($\epsilon$ 16,000); $\lambda_{max.}^{0.1\,N\,NaOH}$ 242 m$\mu$ ($\epsilon$ 8,600), 265 m$\mu$ ($\epsilon$ 8,600) and 356 m$\mu$ ($\epsilon$ 12,900); $\lambda_{max.}^{CHBr_3}$ 5.90, 6.18, 6.41, 7.26$\mu$.

In a solution the title compound is in equilibrium with the corresponding 2,3-enol: 3-hydroxy-2-nitropregna-2,4-dien-20-one.

EXAMPLE III

*Preparation of 20-Ethylenedioxy-21-Hydroxy-2α-Nitropregn-4-En-3-One*

Treatment of a solution of 1 g. of 20-ethylenedioxy-21-hydroxypregn-4-en-3-one [H. M. Kissman, A. S. Hoffman and M. J. Weiss, J. Org. Chem., 27, 3168 (1962)] and 780 mg. of sublimed potassium tertiary butoxide in 30 ml. of purified tetrahydrofuran containing 2 ml. of tertiary butanol with a solution of 925 mg. of amyl nitrate in 5 ml. of tetrahydrofuran in the manner described above for the preparation of 20-ethylenedioxy-2α-nitropregn-4-en-3-one (Example I) affords 1 g. of amorphous material. This material is dissolved in 15 ml. of benzene and is chromatographed on 50 g. of silica gel. The column is washed with 400 ml. of benzene and 400 ml. of 5% ether-in-benzene; these washings are discarded. Elution with about 600 ml. of 10% ether-in-benzene and evaporation of the eluate gives 200 mg. of an intractable syrup. Continued elution (1000 ml. of 10% ether-in-benzene) and evaporation of the eluate furnishes a crystalline residue which upon recrystallization from ether-petroleum ether gives 200 mg. (18%) of product, melting point 189–192°. Recrystallization from the same solvent pair affords pale-yellow crystals, melting point 192–194°; $[\alpha]_D^{25}$ +168° (0.5% in $CHCl_3$);

$\lambda_{max.}^{MeOH}$ 245 m$\mu$ ($\epsilon$ 15,500) and 375 m$\mu$ ($\epsilon$ 630); $\lambda_{max.}^{0.1\,N\,HCl}$ 252 m$\mu$ ($\epsilon$ 15,000); $\lambda_{max.}^{0.1\,N\,NaOH}$ 245 m$\mu$ ($\epsilon$ 7,750), 268 m$\mu$ ($\epsilon$ 8,000) and 354 m$\mu$ ($\epsilon$ 12,000); $\lambda_{max.}^{CH_3CN}$ 2.82, 5.88, 6.15, 6.37$\mu$.

In solution the title compound is in equilibrium with the corresponding 2,3-enol: 20-ethylenedioxy-3,21-dihydroxy-2-nitropregna-2,4-diene.

EXAMPLE IV

*Preparation of 21-Hydroxy-2α-Nitropregn-4-En-3,20-Dione*

A solution of 78 mg. of 20-ethylenedioxy-21-hydroxy-2α-nitropregn-4-en-3-one (Example III) in 25 ml. of methanol containing 1 ml. of 8% (v./v.) sulfuric acid is refluxed on the steam bath for 45 minutes. The solution is concentrated to near dryness, water is added and the resulting mixture is extracted twice with methylene chloride. The combined extracts are washed with water, dried with anhydrous magnesium sulfate and evaporated to dryness. The residue is recrystallized from acetone-petroleum ether to give 52 mg. (75%) of product, melting point 161–163°; $[\alpha]_D^{25}$ +247° (0.54% in $CHCl_3$);

$\lambda_{max.}^{MeOH}$ 245 m$\mu$ ($\epsilon$ 13,900) and 370 m$\mu$ ($\epsilon$ 750); $\lambda_{max.}^{0.1\,N\,HCl}$ 253 m$\mu$ ($\epsilon$ 14,300); $\lambda_{max.}^{0.1\,N\,NaOH}$ 243 m$\mu$ ($\epsilon$ 6,750), 268 m$\mu$ ($\epsilon$ 7,100) and 355 m$\mu$ ($\epsilon$ 10,900); $\lambda_{max.}^{CH_3CN}$ 2.82, 5.88, 6.15, 6.38$\mu$.

In solution the title compound is in equilibrium with the corresponding 2,3-enol: 3,21-dihydroxy - 2 - nitropregna-2,4-dien-20-one.

EXAMPLE V

*Preparation of 17β-(Tetrahydropyran-2-Yloxy)-5α-Androstan-3-One*

A suspension of 2 g. of 17β-hydroxy-5α-androstan-3-one, 66 mg. of paratoluenesulfonic acid and 0.945 ml. of dihydropyran is stirred at room temperature for one hour. The resulting solution is then allowed to stand for 18 hours. The solution is washed with saturated sodium bicarbonate solution, water, dried with anhydrous magnesium sulfate and evaporated to dryness under reduced pressure. The residue is triturated with petroleum ether (boiling point 20–40°) and the resulting crystalline product is collected by filtration to give 1.77 g. (69%), melting point 98–99°.

EXAMPLE VI

*Preparation of 2-Nitro-17β-(Tetrahydropyran-2-Yloxy)-5α-Androst-2-En-3-Ol*

Treatment of a solution of 700 mg. of 17β- (tetrahydropyran-2-yloxy)-5α-androstan-3-one (Example V) in solution of 25 ml. of tetrahydrofuran containing 315 mg. of sublimed potassium tertiary-butoxide with a solution of 374 mg. of amyl nitrate in 3 ml. of tetrahydrofuran as described for the preparation of 20-ethylenedioxy-2α-nitropregn-4-en-3-one (Example I) gives a semi-solid upon evaporation to dryness. Recrystallization from a minimum amount of petroleum ether (boiling point 60–70°) gives 402 mg. (52%) of product, melting point 147–150°; $[\alpha]_D^{25}$ +43° (0.74% in CHCl$_3$);

$\lambda_{max.}^{MeOH}$ 227 m$\mu$ ($\epsilon$3087) and 331 m$\mu$ ($\epsilon$8160); $\lambda_{max.}^{0.1\,N\,HCl}$ 230 m$\mu$ (shoulder) ($\epsilon$9400) and 339 m$\mu$ ($\epsilon$9200); $\lambda_{max.}^{0.1\,N\,NaOH}$ 230 m$\mu$ (shoulder) ($\epsilon$5650) and 340 m$\mu$ ($\epsilon$103,00); $\lambda_{max.}^{CH_3CN}$ 5.76, 6.14, 6.41, 7.47$\mu$.

The product is an equilibrium mixture of the title compound and the corresponding 3-ketone: 2α-nitro-17β-(tetrahydropyran-2-yloxy)-5α-androstan-3-one.

EXAMPLE VII

*Preparation of 2-Nitro-5α-Androst-2-ene-3,17β-Diol*

A suspension of 183 mg. of 2-nitro-17β-(tetrahydropyran-2-yloxy)-5α-androst-2-en-3-ol (Example VI) in 35 ml. of methanol containing 5 ml. of water and 0.5 ml. of 8% (v./v.) sulfuric acid is stirred at room temperature for 18 hours. The resulting solution is neutralized by the addition of Duolite A–4 resin and then filtered. The mother liquor is concentrated to near dryness, diluted with methylene chloride and the resulting solution is washed with water, dried with anhydrous magnesium sulfate and evaporated to dryness under reduced pressure. Crystallization from ether petroleum ether (boiling point 60–70°) gives 83 mg. (47%) of product, melting point 135–137°. Recrystallization from the same solvent pair gives white crystals, melting point 136–137°; $[\alpha]_D^{25}$ +112° (0.84% in CHCl$_3$);

$\lambda_{max.}^{MeOH}$ 230 m$\mu$ ($\epsilon$2500) and 331 m$\mu$ ($\epsilon$6900); $\lambda_{max.}^{0.1\,N\,HCl}$ 230 m$\mu$ ($\epsilon$2500) and 337 m$\mu$ ($\epsilon$6000); $\lambda_{max.}^{0.1\,N\,NaOH}$ 230 m$\mu$ ($\epsilon$4950) and 338 m$\mu$ ($\epsilon$11,800); $\lambda_{max.}^{CH_3CN}$ 2.83, 5.57, 6.16, 6.40, 7.43$\mu$.

The product is a mixture of the title compound and the corresponding 3-ketone: 17β-hydroxy-2α-nitro- 5α-androstan-3-one.

EXAMPLE VIII

*Preparation of 17α-Methyl-2-Nitro-5α-Androst-2-Ene-3,17β-Diol*

Treatment of a solution of 1 g. of 17β-hydroxy-17α-methyl-5α-androstan-3-one in a solution of 30 ml. of tetrahydrofuran containing 772 mg. of potassium tertiary-butoxide and 2 ml. of tertiary-butanol with a solution of 482 mg. of amyl nitrate in 3 ml. of tetrahydrofuran in the manner described above for the preparation of 20-ethylenedioxy - 2α - nitropregn-4-en-3-one (Example I) gives 1.07 g. of amorphous material. This material is dissolved in 15 ml. of benzene and chromatographed on 50 g. of silica gel. The column is washed with 200 ml. of benzene, 200 ml. of 5% ether-in-benzene and 200 ml. of 10% ether-in-benzene; these washings are discarded. Elution with 400 ml. of 15% ether-in-benzene and evaporation of the eluate furnishes 587 mg. of syrupy material which crystallizes after standing for several days. Recrystallization of a portion from ether-petroleum gives buff-colored crystals, melting point 85° (gas);

$\lambda_{max.}^{MeOH}$ 225 m$\mu$ ($\epsilon$3300) and 330 m$\mu$ ($\epsilon$7000); $\lambda_{max.}^{0.1\,N\,HCl}$ 337 m$\mu$ ($\epsilon$4900); $\lambda_{max.}^{0.1\,N\,NaOH}$ 337 m$\mu$ ($\epsilon$23,000); $\lambda_{max.}^{CH_3CN}$ 2.83, 6.17, 6.40$\mu$.

The product is a mixture of the title compound and the corresponding 3-ketone: 17β-hydroxy-17α-methyl-2α-nitro-5α-androst-3-one.

Continued elution of the column with 25% ether-in-benzene furnishes 100 mg. of crystalline material, melting point 189–190°, identified as starting material by mixture melting point and infrared comparison.

EXAMPLE IX

*Preparation of 2α-Nitro-17β-(Tetrahydropyran-2-Yloxy)-Androst-4-En-3-One*

Treatment of a solution of 3.3 g. of 17β-(tetrahydropyran-2-yloxy)-androst-4-en-3-one [H. C. Ott, M. F. Murray and S. L. Pederson, J. Am. Chem. Soc., 74, 1239 (1952)] in a solution of 100 ml. of tetrahydrofuran containing 1.65 g. of sublimed potassium tertiary butoxide with a solution of 1.95 g. of amyl nitrate in 16 ml. of tetrahydrofuran in the manner described above for the preparation of 20-ethylenedioxy-2α-nitropregn-4-en-3-one (Example I) furnishes 4 g. of crude product. This material is dissolved in 25 ml. of benzene and chromatographed on 120 g. of silica gel. The column is washed with 300 ml. of benzene and this washing is discarded. Elution with 1000 ml. of 5% ether-in-benzene and evaporation of the elutate gives an amorphous residue which is crystallized from acetone-petroleum ether (boiling point 60–70°) to give 1.55 g. of product, melting point 161–163° (gas). Recrystallization from acetone-petroleum ether (boiling point 60–70°) gives yellow needles, melting point 164–166° (gas); $[\alpha]_D^{28}$ +135° (0.96% in CHCl$_3$);

$\lambda_{max.}^{MeOH}$ 245 m$\mu$ ($\epsilon$14,200) and 375 m$\mu$ ($\epsilon$1040); $\lambda_{max.}^{0.1\,N\,HCl}$ 253 m$\mu$ ($\epsilon$15,000); $\lambda_{max.}^{0.1\,N\,NaOH}$ 246 m$\mu$ ($\epsilon$7300), 268 m$\mu$ ($\epsilon$7500) and 355 m$\mu$ ($\epsilon$11,200); $\lambda_{max.}^{KBr}$ 5.91, 6.18, 6.42, 7.25$\mu$.

NMR: (Varian A–60 instrument, tetramethylsilane- internal standard) 328.5 c.p.s. (quartet, J=9.5 c.p.s.)

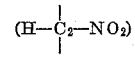

(H—C$_2$—NO$_2$)

358 c.p.s. (C–4 H).

In solution, the title compound is in equilibrium with the corresponding 2,3-enol: 3-hydroxy-2-nitro-17β-(tetrahydropyran-2-yloxy)-androst-2,4-diene.

EXAMPLE X

*Preparation of 2α-Nitrotestosterone (17β-Hydroxy-2α-Nitroandrost-4-En-3-One*

A suspension of 197 mg. of 2α-nitro-17β-(tetrahydropyran-2-yloxy)androst-4-en-3-one (Example IX) in 35 ml. of methanol containing 5 ml. of water and 0.5 ml. of 8% (v./v.) sulfuric acid is stirred at room temperature for 18 hours. The resulting solution is concentrated to a small volume under reduced pressure and extracted twice with methylene chloride. The combined extracts are washed with water, dried with anhydrous magnesium sulfate and evaporated to dryness under reduced pressure giving a glass, crystallization of which from aqueous methanol gives 132 mg. (84%) of product as a methanolate, melting point 95–99° (gas). Recrystallization from petroleum ether (boiling point 60–70°)-methanol gives yellow plates, melting point 98–101° (gas); $[\alpha]_D^{25}$ +191° (0.68% in CHCl$_3$);

$\lambda_{max.}^{MeOH}$ 244 m$\mu$ ($\epsilon$14,600) and 370 m$\mu$ ($\epsilon$910); $\lambda_{max.}^{0.1\,N\,HCl}$ 252 m$\mu$ ($\epsilon$14,800); $\lambda_{max.}^{0.1\,N\,NaOH}$ 242 m$\mu$ ($\epsilon$7,300), 268 m$\mu$ ($\epsilon$7,700) and 355 m$\mu$ ($\epsilon$11,900); $\lambda_{max.}^{CH_3CN}$ 2.78, 5.87, 6.14, 6.36$\mu$.

In solution, the title compound is in equilibrium with the corresponding Δ$^2$ - enol: 3,17β - dihydroxy - 2 - nitroandrost-2,4-diene.

EXAMPLE XI

*Preparation of 17β-Hydroxy-17α-Methyl-2α-Nitroandrost-4-En-3-One*

Treatment of 1 g. of 17α-methyltestosterone (17β-hydroxy-17α-methylandrost-4-en-3-one) in a solution of 30 ml. of tetrahydrofuran containing 780 mg. of potassium tertiary butoxide and 2 ml. of tertiary butanol with a solution of 485 mg. of amyl nitrate in 3 ml. of tetrahydrofuran in the manner described above for the preparation of 20-ethylenedioxy-2α-nitropregn-4-en-3-one (Example I) gives 1.2 g. of amorphous material. This material is dissolved in 50 ml. of benzene and chromatographed on 50 g. of silica gel. The column is washed with 200 ml. of 5% ether-in-benzene and 200 ml. of 10% ether-in-benzene; these washings are discarded. Elution with 500 ml. of 15% ether-in-benzene and evaporation of the eluate furnishes crystalline material. Recrystallization from ether-petroleum ether (boiling point 60–70°) furnishes 100 mg. of product, melting point 199–200° dec.; $[\alpha]_D^{24}$ +81.5° (0.80% in $CHCl_3$);

$\lambda_{max.}^{MeOH}$ 241 m$\mu$ ($\epsilon$ 9,400); $\lambda_{max.}^{KBr}$ 2.90, 3.11, 5.91, 6.15, 6.50, 7.30$\mu$.

In solution, the title compound is in equilibrium with the corresponding $\Delta^2$-enol: 3,17β-dihydroxy-17α-methyl-2-nitroandrost-2,4-diene.

EXAMPLE XII

*Preparation of 17β-Hydroxy-4β-Nitro-5β-Androstan-3-One*

Treatment of 4 g. of 17β-hydroxy-5β-androstan-3-one in a solution of 120 ml. of tetrahydrofuran containing 3.24 g. of potassium tertiary butoxide and 3 ml. of tertiary butanol with a solution of 2.02 g. of amyl nitrate in 12 ml. of tetrahydrofuran in the manner described above for the preparation of 20-ethylenedioxy-2α-nitropregn-4-en-3-one (Example I) gives 5 g. of an intractable material. This material is dissolved in 50 ml. of benzene and chromatographed on 200 g. of silica gel. The column is washed with 500 ml. of benzene, 500 ml. of 5% ether-in-benzene, 500 ml. of 10% ether-in-benzene, 500 ml. of 15% ether-in-benzene and 500 ml. of 20% ether-in-benzene; these washings are discarded. Elution with 750 ml. of 25% ether-in-benzene followed by evaporation of the eluate and recrystallization of the residue from acetone-petroleum ether (boiling point 60–70°) furnishes 1.504 g. (32%) of product, melting point 190–191°; $[\alpha]_D^{25}$ +66° (0.9% in $CHCl_3$);

$\lambda_{max.}^{0.1\ N\ NaOH}$ 235 m$\mu$ ($\epsilon$ 11,900); $\lambda_{max.}^{CH_3CN}$ 2.82, 5.73, 6.09, 6.37$\mu$ NMR: (Varian A–60 instrument, tetramethylsilane-internal standard) 345.5 c.p.s. (doublet, $j$=13 c.p.s.)

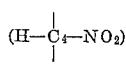

$$(H-\underset{|}{\overset{|}{C_4}}-NO_2)$$

EXAMPLE XIII

*Preparation of 2α-Nitrohydrocortisone (11β,17α,21-Trihydroxy-2α-Nitropregn-4-Ene-3,20-Dione*

Treatment of 1 g. of 20-ethylenedioxy-11β,17α,21-trihydroxypregn-4-en-3-one [H. M. Kissman, A. M. Small and M. J. Weiss, J. Am. Chem. Soc., 82, 2312 (1960)] in a solution of 40 ml. of purified tetrahydrofuran containing 1.24 g. of sublimed potassium tertiary butoxide and 2 ml. of purified tertiary butanol with a solution of 1.48 g. of amyl nitrate in 5 ml. of tetrahydrofuran in the manner described above for the preparation of 20-ethylenedioxy-2α-nitropregn-4-en-3-one (Example I) gives 600 mg. of amorphous material. This material is subjected to partition chromatography on Celite diatomaceous earth. The system heptane-ethyl-acetate-methanol-water (55:45:12:8) is used; the column is packed with 570 g. of Celite diatomaceous earth and the recording spectrophotometer is set at 240 m$\mu$. The first 1 liter of effluent contains a negligible amount of material; the next 1 liter of effluent contains the major peak which on evaporation gives 85 mg. of crude 20-ethylenedioxy-11β,17α,21-trihydroxy-2α-nitropregn-4-en-3-one which in solution is in equilibrium with the corresponding $\Delta^2$-enol: 20-ethylene-dioxy-3,11β,17α,21-tetrahydroxy-2-nitropregna-2,4-diene.

Ketal hydrolysis is accomplished by treatment of this material with 25 ml. of methanol containing 1 ml. of 8% (v./v.) sulfuric acid for one hour at the reflux temperature to give 33 mg. of the desired product, melting point 175–180° dec., after one recrystallization from ether-petroleum ether;

$\lambda_{max.}^{KBr}$ 2.90, 5.85, 5.95, 6.20, 6.45, 7.30$\mu$

The product of the example in solution is in equilibrium with the corresponding $\Delta^2$-enol: 3,11β,17α,21-tetrahydroxy-2-nitropregna-2,4-dien-20-one.

EXAMPLE XIV

*Preparation of 17β-Hydroxy-4α-Nitro-5α-Androstan-3-One*

A solution of 3 g. of testosterone in 30 ml. of purified tetrahydrofuran is added to a stirred solution containing 219 mg. of lithium in about 500 ml. of anhydrous liquid ammonia (dried by prior addition of minimum pieces of lithium until the blue color is retained). Towards the end of the addition the blue color gradually disappears until at the end of the addition the blue color is completely discharged, resulting in a milky white solution. A solution containing 10 g. of amyl nitrate in 10 ml. of tetrahydrofuran is added and the resulting solution is stirred for about 18 hours. Ammonium chloride (5 g.) is added followed by 200 ml. of water and 200 ml. of ether. A crystalline material separates and is collected by filtration. This material (655 mg.) does not contain nitrogen according to combustion analysis and is set aside. The mother liquor is evaporated to dryness to give an intractable syrup. This material is dissolved in 20 ml. of benzene and chromatographed in 10.0 g. of silica gel. The column is washed with 250 ml. of benzene, 250 ml. of 5% ether-in-benzene, and 250 ml. of 10% ether-in-benzene; these washings are discarded. Elution with 1000 ml. of 15% ether-in-benzene and evaporation of the eluate gives 703 mg. of an intractable syrup. This material is subjected to partition chromatography on Celite diatomaceous earth. The system heptane-methanol is used; the column is packed with 550 g. of Celite diatomaceous earth. The first 2¾ l. of effluent contains a negligible amount of material; the next 1 liter of effluent contains the major peak which on evaporation gives 414 mg. (12%) of product;

$\lambda_{max.}^{CHCl_3}$ 2.90, 5.85, 6.50, 7.30$\mu$

EXAMPLE XV

*Preparation of 17β-Hydroxy-4α-Methyl-5α-Androstan-3-One*

A solution containing 2 g. of testosterone in 20 ml. of purified tetrahydrofuran is added to a stirred solution containing 146 mg. (3 equivalents) of lithium in about 100 ml. of anhydrous liquid ammonia (dried by prior addition of minimum pieces of lithium until blue color is retained). Towards the end of the addition the blue color gradually disappears until at the end of the addition the color is completely discharged, resulting in a milky white solution. A solution containing 3 ml. of methyliodide in 20 ml. of reagent ether is added and the resulting solution stirred for three hours. After the addition of 2 ml. of methyliodide in 15 ml. of ether, the solution is stirred for four days. Ammonium chloride (3 g.) is added followed by water and methylene chloride. The organic phase is washed with water, dried with anhydrous magnesium sulfate and evaporated to dryness. The resulting amorphous material (1.9 g.) is dissolved in 25 ml. of benzene and chromatographed on 125 g. of silica gel. The column is washed with 1 liter of benzene, 500 ml. of 5% ether-in-benzene, 500 ml. of 10% ether-in-benzene, 500 ml. of 15% ether-in-benzene and 500 ml. of 20% ether-in-benzene; these washings are discarded. The desired product is eluated with 25% ether-in-benzene (1125 ml.). The combined eluates are evaporated to dryness to give 814 mg. of 17β-hydroxy-4α-methyl-5α-androstane-3-one, melting point 198–203°. Recrystallization from acetone-petroleum ether gives white crystals, melting point 201–203°. The material has no ultraviolet absorption at 20 γ/ml.; $[α]_D^{30}+8.6°$ (1% in $CHCl_3$); $λ_{max}$ 2.81, 5.84μ. This product is identical by infrared and mixture melting point comparison with authentic 17β-hydroxy-4α-methyl-5α-androstan-3-one.

EXAMPLE XVI

*Preparation of 9α-Fluoro-11β-Hydroxy-2α-Nitro-17α,20: 20,21-Bismethylenedioxypregn-4-En-3-One*

Treatment of a solution of 1 g. of 9α-fluoro-11β-hydroxy-17α,20:20,21-bismethylenedioxypregn-4-en-3-one in a solution of 30 ml. of tetrahydrofuran containing 692 mg. of sublimed potassium tertiary butoxide with a solution of 820 mg. of amyl nitrate in 5 ml. of tetrahydrofuran in the manner described above for the preparation of 20-ethylenedioxy-2α-nitropregn-4-en-3-one (Example I) gives 1.2 g. of an amorphous material. This material is dissolved in 25 ml. of benzene and chromatographed on 50 g. of silica gel. The column is washed with 1000 ml. of benzene and 1000 ml. of 5% ether-in-benzene; these washings are discarded. Elution with 500 ml. of ether and evaporation of the eluate furnishes 961 mg. of product;

$λ_{max}^{MeOH}$ 243 mμ; $λ_{max}^{KBr}$ 2.80, 5.85, 6.01, 6.40, 6.50, 7.31 9.10μ.

The product of this example in solution is in equilibrium with the corresponding 2,3-enol: 9α-fluoro-3,11β-dihydroxy-2-nitro-17α,20:20,21 - bismethylenedioxypregna-2,4-diene.

We claim:
1. A member of the group consisting of a compound of the formula:

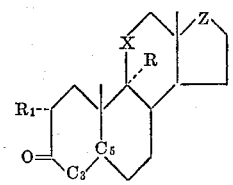

in which Z is selected from the group consisting of:

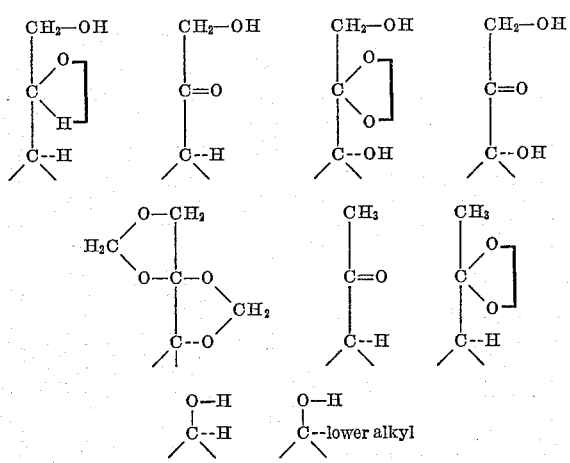

and

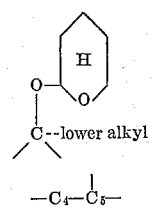

is selected from the group consisting of:

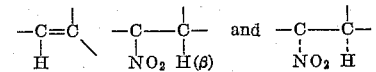

X is selected from the group consisting of

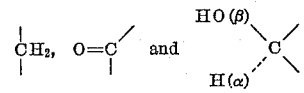

groups, R is selected from the group consisting of hydrogen and fluorine atoms, $R_1$ is selected from the group consisting of hydrogen and nitro groups, one and only one nitro group being present on the steroid; and the corresponding 2,3-enols.

2. A member of the group consisting of a compound of the formula:

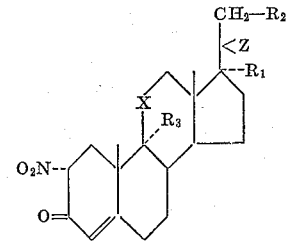

in which $R_1$ is selected from the group consisting of hydrogen and hydroxy radicals; $R_2$ is selected from the group consisting of hydrogen, and hydroxy; $R_3$ is selected from the group consisting of hydrogen and fluorine radicals; Z is selected from the group consisting of oxygen and lower alkylenedioxy radicals; X is a divalent radical selected from the group consisting of

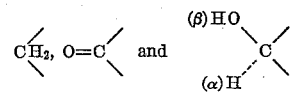

and when taken together $R_1$, $R_2$ and Z is the 17α,20:20,21-bismethylenedioxy group; and the corresponding 2,3-enols.

3. A member of the group consisting of a compound of the formula:

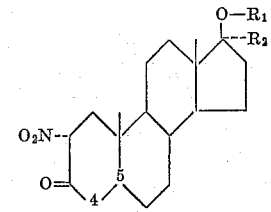

in which $R_1$ is selected from the group consisting of hydrogen and 2-tetrahydropyranoyloxy, $R_2$ is selected from the group consisting of hydrogen and lower alkyl radicals; —$C_4$—$C_5$— is a divalent radical selected from the group consisting of

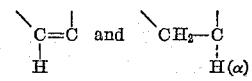

and the corresponding 2,3-enols.

4. A compound of the formula:

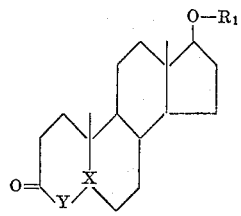

in which $R_1$ is hydrogen; Y is a divalent radical selected from the group consisting of

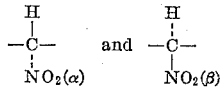

and X is a trivalent radical selected from the group consisting of

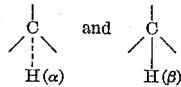

5. The compound 20-ethylenedioxy-2α-nitropregn-4-en-3-one.

6. The compound 2α-nitropregn-4-en-3,20-dione.

7. The compound 20-ethylenedioxy-21-hydroxy-2α-nitropregn-4-en-3-one.

8. The compound 21-hydroxy-2α-nitropregn-4-en-3,20-dione.

9. The compound 2-nitro-17β-(tetrahydropyran-2-yloxy)-5α-androst-2-en-3-ol.

10. The compound 2-nitro-5α-androst-2-ene-3,17β-diol.

11. The compound 17α-methyl-2-nitro-5α-androst-2-ene-3,17β-diol.

12. The compound 17β-hydroxy-4α-nitro-5α-androstan-3-one.

13. The compound 2α-nitro-17β-(tetrahydropyran-2-yloxy)-androst-4-en-3-one.

14. The compound 17β-hydroxy-2α-nitro-androst-4-en-3-one.

15. The compound 17β-hydroxy-17α-methyl-2α-nitro-androst-4-en-3-one.

16. The compound 17β-hydroxy-4β-nitro-5β-androstan-3-one.

17. A process for the preparation of $C_4$-enolate anions of 5α-3-keto steroids of the androstane series, which comprises treating a $\Delta^4$-3-keto steroid of the androstane series with a solution of lithium in liquid ammonia.

18. A process for the preparation of 4α-lower alkyl-5α-3-keto steroids of the androstane series which comprises treating a $\Delta^4$-3-keto steroid of the androstane series with a solution of lithium in liquid ammonia and subsequently with a member selected from the group consisting of lower alkyl halides and lower alkyl sulfonates.

19. A process for the preparation of 4α-nitro-5α-3-keto steroids of the androstane series which comprises treating a $\Delta^4$-3-keto steroid of the androstane series with a solution of lithium in liquid ammonia and subsequently with an alkyl nitrate.

20. A process for the preparation of 2α-nitro-$\Delta^4$-3-keto steroids and the corresponding 2,3-enols selected from the group consisting of the androstane series and pregnane series which comprises treating a $\Delta^4$-3-keto steroid selected from the group consisting of the androstane series and pregnane series with an alkali metal alkoxide and an alkyl nitrate in an anhydrous solvent.

No references cited.

UNITED STATES PATENT OFFICE
CERTIFICATE OF CORRECTION

September 29, 1964

Patent No. 3,151,109

Robert E. Schaub et al.

It is hereby certified that error appears in the above numbered patent requiring correction and that the said Letters Patent should read as corrected below.

Column 1, lines 47 to 50, for that portion of the left-hand structural formula reading "O-N" read -- O-H --; same lines 47 to 50, for that portion of the right-hand structural formula reading "O=H" read -- O-H --; column 7, line 19, for "(ε103,00)" read -- (ε10,300) --; line 45, for "5.57" read -- 5.75 --; column 9, line 22, for "6.15" read -- 6.16 --; column 11, lines 45 to 53, for that portion of the formula reading $\diagdown C_3 \diagup$     read     $\diagdown C_4 \diagup$ Signed and sealed this 17th day of May 1966.

(SEAL)
Attest:

ERNEST W. SWIDER
Attesting Officer

EDWARD J. BRENNER
Commissioner of Patents